United States Patent
Wittenbach et al.

(10) Patent No.: US 12,175,529 B2
(45) Date of Patent: Dec. 24, 2024

(54) METHODS AND SYSTEMS FOR GENERATING RECOMMENDATIONS FOR CAUSES OF COMPUTER ALERTS THAT ARE AUTOMATICALLY DETECTED BY A MACHINE LEARNING ALGORITHM

(71) Applicant: Capital One Services, LLC, McLean, VA (US)

(72) Inventors: Jason Wittenbach, North Reading, MA (US); Samuel Sharpe, Cambridge, MA (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 18/489,425

(22) Filed: Oct. 18, 2023

(65) Prior Publication Data
US 2024/0046350 A1 Feb. 8, 2024

Related U.S. Application Data

(63) Continuation of application No. 17/179,141, filed on Feb. 18, 2021, now Pat. No. 11,798,074.

(51) Int. Cl.
| | |
|---|---|
| *G06Q 40/03* | (2023.01) |
| *G06N 3/08* | (2023.01) |
| *G06N 5/045* | (2023.01) |
| *H04L 9/40* | (2022.01) |

(52) U.S. Cl.
CPC ............ *G06Q 40/03* (2023.01); *G06N 3/08* (2013.01); *G06N 5/045* (2013.01); *H04L 63/1425* (2013.01)

(58) Field of Classification Search
CPC ..................... G06Q 40/03; H04L 63/1425
See application file for complete search history.

(56) References Cited

U.S. PATENT DOCUMENTS

| | | | | |
|---|---|---|---|---|
| 2019/0236271 A1* | 8/2019 | Shivanna | ............. | H04L 9/0863 |
| 2020/0219372 A1* | 7/2020 | Kwatra | ................. | G06F 16/906 |
| 2020/0314118 A1* | 10/2020 | Levin | .................. | H04L 63/1466 |

* cited by examiner

*Primary Examiner* — Scott C Anderson
(74) *Attorney, Agent, or Firm* — Foley & Lardner LLP

(57) ABSTRACT

Methods and systems are disclosed for generating recommendations for causes of computer alerts that are automatically detected by a machine learning algorithm are described. For example, the system may receive a first feature vector with an unknown alert status, wherein the first feature vector represents values corresponding to a plurality of computer states in a first computer system. The system may input the first feature vector into an artificial neural network, wherein the artificial neural network is trained to detect a known alert status based on a set of training data comprising labeled feature vectors corresponding to the known alert status, and wherein the artificial neural network is trained to detect conditional expectations the plurality of computer states in an inputted feature vector.

10 Claims, 5 Drawing Sheets

METHODS AND SYSTEMS FOR GENERATING RECOMMENDATIONS FOR CAUSES OF COMPUTER ALERTS THAT ARE AUTOMATICALLY DETECTED BY A MACHINE LEARNING ALGORITHM

CROSS-REFERENCE TO RELATED APPLICATION(S)

This application is a continuation of U.S. patent application Ser. No. 17/179,141, filed Feb. 18, 2021. The content of the foregoing application is incorporated herein in its entirety by reference.

FIELD OF THE INVENTION

The invention relates to generating recommendations for causes of computer alerts that are automatically detected by a machine learning algorithm.

BACKGROUND

In conventional systems, computer alerts are routinely generated based on automated processes. For example, in cyber security systems, the system may process numerous amounts and types of data to detect a cyber instance. In these systems, visibility into the underlying cause of such computer alerts is necessary, however. For example, the system needs to be able to generate a recommendation of what triggered a given computer alert. Because of this, computer alert systems relay on systems that provide visibility into what triggered the computer alert.

SUMMARY

Methods and systems are described herein for the use of artificial neural networks in detecting a computer alert status based on values corresponding to a plurality of computer states of the computer system. To provide visibility into the cause of the computer alert, the system relies on detecting SHAP ("SHapley Additive exPlanations") values. SHAP values take a game-theoretic approach to providing predictive model explanations in the form of feature importances. In this setting, the features in a data point are considered "players" in a coalitional game that results in the model's prediction, which is interpreted as the "score" that that particular group of players achieved. Determining how to attribute this score across the various players' contributions would, in the predictive modeling setting, provide an explanation of the model's prediction that determines how each feature contributed to that outcome. With Shapley game theory, this attribution is done by asking how "leaving out" a particular player would change the score that the team achieves; however most machine learning models fail to produce an output unless all of the features are specified. To avoid this, SHAP defines the result of a model when a subset of features is left out as the conditional expectation of the model's output over the left-out feature values given the fixed values of the left-in feature values.

However, computing this conditional expectation involves a deep understanding of the distribution of the features, which is not available, particularly in practical applications such as (cyber-security, fraud prevention, credit denials, etc.). Thus, the use of SHAP would require an approximation and assumption that the features are independent. By doing so, the conditional expectation may be reduced to a marginal expectation, which may be approximated by sampling feature values independently from the training data. Unfortunately, while formulating a SHAP system to be a model agnostic explanation technique, the system still has major drawbacks: (1) the necessity of a sampling-based approach adds to the computational complexity of the algorithm, and (2) the approximation of independent features is unlikely to hold in most real datasets, and its impacts on the fidelity of the explanations could be severe. For example, sampling-based approaches in practical applications would require exorbitant amounts of processing power. Likewise, resulting data sets (i.e., solutions in the practical applications) may not be "real" data sets in the practical application. For example, in a cyber-security application, the solution may provide a prediction and/or results having characteristics (e.g., network activity) that lie outside the characteristics that are achieved during use of the practical application (e.g., network activity that is infeasible and/or otherwise an outlier to actual data (e.g., network activity that does not exist)).

Accordingly, the methods and systems described herein overcome these drawbacks to enable SHAP values to be used in generating recommendations for causes of computer alerts that are automatically detected by machine learning algorithms, such as unsupervised neural networks. To address these issues, the system deviates from the conventional model agnosticism of SHAP systems in order to avoid the potentially problematic assumption of feature independence. Additionally, the system performs additional computational overhead up front during model training to reduce the later complexity of generating explanations. The system achieves this by using a novel artificial novel artificial neural network architecture that is trained to be able to not only make predictions but also compute the conditional expectations that are the theoretical foundation of the SHAP approach.

For example, in some embodiments, the system comprises a modified version of a fully-connected neural network, in which the input layer to the neural network is augmented with a set of binary masks, one for each feature in the original input. The system then trains the neural network using gradient descent where, at each gradient descent step, the system randomly selects a subset of the masks to be on (e.g., set to a value of "1") or off (e.g., set to a value of "0," a mean or mode for that feature, or selected randomly from the training values). Accordingly, the system learns to make accurate predictions in the circumstances where there is missing data, by using information about which features are missing to guide its training. Once the system is trained, the system may make full predictions by simply setting all mask values to "on" and leaving the feature input unchanged. The system may also predict conditional expectations by setting the masks for any of the features to be left out to "off" and mangling the corresponding feature values. These conditional expectations can then be used to predict SHAP values with no need for assuming feature independence or a more complex sampling-based approach.

In one aspect, methods and systems for generating recommendations for causes of computer alerts that are automatically detected by a machine learning algorithm are described. For example, the system may receive a first feature vector with an unknown alert status, wherein the first feature vector represents values corresponding to a plurality of computer states in a first computer system. The system may input the first feature vector into an artificial neural network, wherein the artificial neural network is trained to detect a known alert status based on a set of training data comprising labeled feature vectors corresponding to the known alert status, and wherein the artificial neural network is trained to detect conditional expectations the plurality of computer states in an inputted feature vector. The system may receive a first prediction from the artificial neural network, wherein the first prediction indicates whether the first feature vector corresponds to the known alert status. The system may receive a second prediction from the artificial neural network, wherein the second prediction indicates a conditional expectation for each value of the first feature vector. The system may determine an impact of each value of the first feature vector on the first prediction based on the second prediction. The system may generate for display, on a user interface, a recommendation for a cause of the known alert status in the first computer system based on the impact of each value of the first feature vector on the first prediction.

Various other aspects, features, and advantages of the invention will be apparent through the detailed description of the invention and the drawings attached hereto. It is also to be understood that both the foregoing general description and the following detailed description are examples and not restrictive of the scope of the invention. As used in the specification and in the claims, the singular forms of "a," "an," and "the" include plural referents unless the context clearly dictates otherwise. In addition, as used in the specification and the claims, the term "or" means "and/or" unless the context clearly dictates otherwise.

DETAILED DESCRIPTION OF THE DRAWINGS

In the following description, for the purposes of explanation, numerous specific details are set forth in order to provide a thorough understanding of the embodiments of the invention. It will be appreciated, however, by those having skill in the art that the embodiments of the invention may be practiced without these specific details or with an equivalent arrangement. In other cases, well-known structures and devices are shown in block diagram form in order to avoid unnecessarily obscuring the embodiments of the invention.

Figure 1:
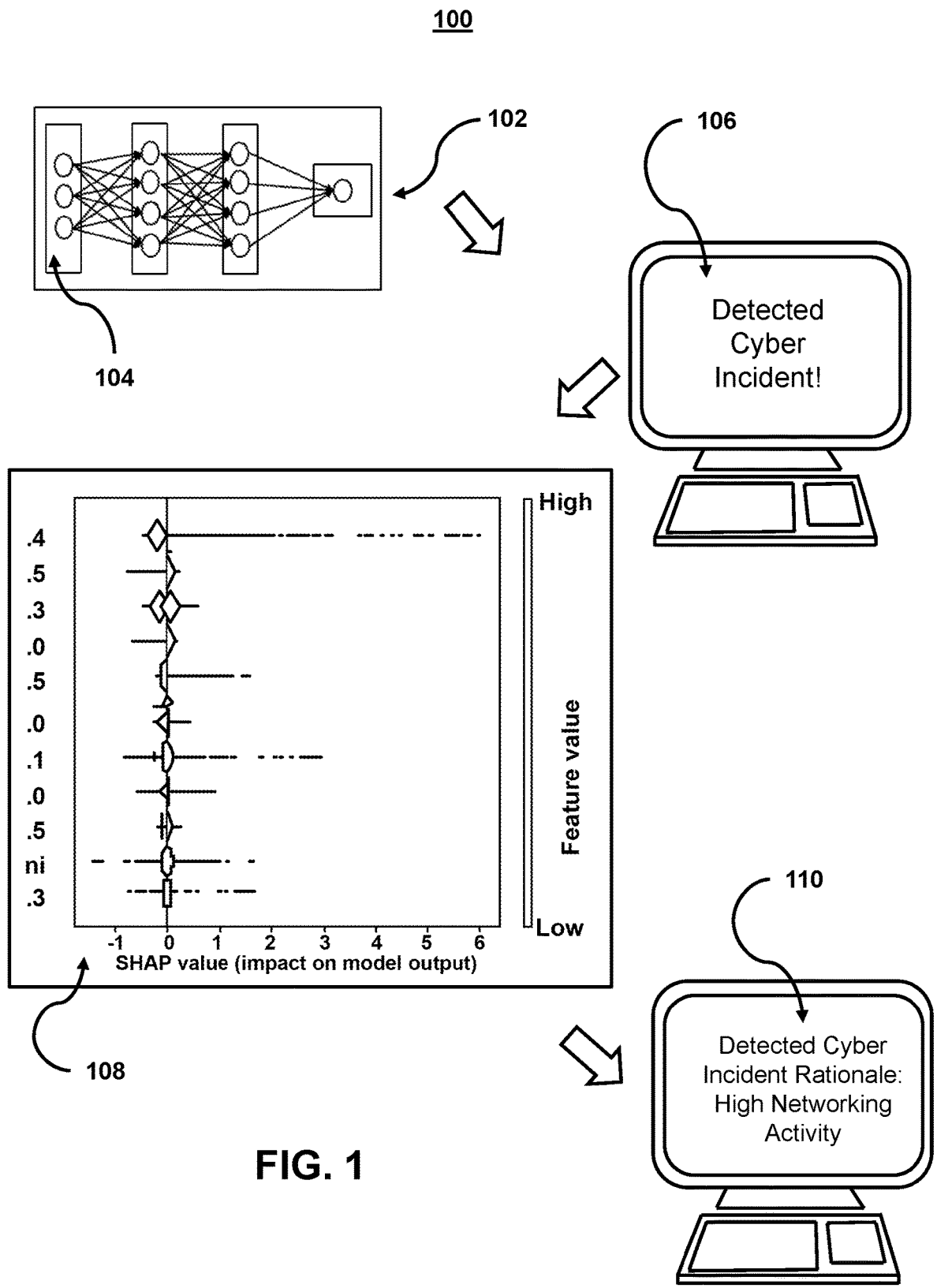
FIG. 1 shows a diagram for generating recommendations for causes of computer alerts that are automatically detected by a machine learning algorithm, in accordance with one or more embodiments.

FIG. 1 shows a diagram for generating recommendations for causes of computer alerts that are automatically detected by a machine learning algorithm, in accordance with one or more embodiments. For example, the methods and systems described herein overcome these drawbacks to enable SHAP values to be used in generating recommendations for causes of computer alerts that are automatically detected by machine learning algorithms such as unsupervised neural networks. To address these issues, the system deviates from the conventional model agnosticism of SHAP systems in order to avoid the potentially problematic assumption of feature independence. Additionally, the systems additional computational overhead up front during model training to reduce the later complexity of generating explanations. The system achieves this by using a novel artificial neural network architecture that is trained to be able to not only make predictions but also compute the conditional expectations that are the theoretical foundation of the SHAP approach.

For example, SHAP values are beneficial in determining global interpretability— the collective SHAP values can show how much each predictor contributes, either positively or negatively, to a target variable. For example, as shown in plot 108, the system may generate a variable importance plot, but it is able to show the positive or negative relationship for each variable with the target. The system may also determine local interpretability— each observation gets its own set of SHAP values, which greatly increases its transparency. For example, the system may generate a prediction and the contributions of the predictors. For example, while conventional variable importance algorithms only show the results across the entire population but not on each individual case, the local interpretability of the present system enables artificial neural network 102 to pinpoint and contrast the impacts of the factors.

As shown in diagram 100, the system comprises a modified version of a fully-connected neural network (e.g., artificial neural network 102). For example, input layer 104 to artificial neural network 102 may augmented with a set of binary masks, one for each feature in the original input. The system then trains the neural network using gradient descent where, at each gradient descent step, the system randomly selects a subset of the masks to be on (e.g., set to a value of "1") or off (e.g., set to a value of "0," a mean or mode for that feature, or selected randomly from the training values). For example, the binary mask may localize the most important aspects of each value of the feature input for prediction of artificial neural network 102. The binary masks create a secondary network whose goal is to create as small an explanation as possible while still preserving the predictive accuracy of artificial neural network 102. As described in FIG. 3 below, artificial neural network 102 may have different architectures and uses such as classification with CNNs, with RNNs, and mixed CNN/RNN architectures.

The system learns to make accurate predictions in the circumstances where there is missing data, by using information about which features are missing to guide its training. For example, artificial neural network 102 may generate computer status alert 106 indicating a detected cyber incident setting all mask values to on and leaving a feature input unchanged. Artificial neural network 102 may also predict conditional expectations by setting the masks of any of the values (e.g., features) to be left out to off and mangling the corresponding feature values. These conditional expectations can then be used to predict SHAP values with no need for assuming feature independence or a more complex sampling-based approach. For example, artificial neural network 102 may generate data as expressed in plot 108. As shown in FIG. 1, plot 108 may include a list of feature importance in which variables are ranked in descending order. Plot 108 may also indicate impact (e.g., a horizontal location may show whether the effect of that value is associated with a higher or lower prediction). Plot 108 may also show a relationship to an original value (e.g., a color may indicate whether a variable is high (in red) or low (in blue) for that feature input). Additionally, plot 108 may indicate a correlation such that a high measurement or other value of a variable has a high and positive impact on the triggering the computer status alert.

It should be noted, that in some embodiments, plot 108 may be generated for display along with computer status alert 106 and/or recommendation 110. Alternatively, diagram 100 may generate recommendation 110 based on automatically processing the data underlying plot 108 (e.g., generate a recommendation without graphically representing the data in plot 108).

Figure 2:
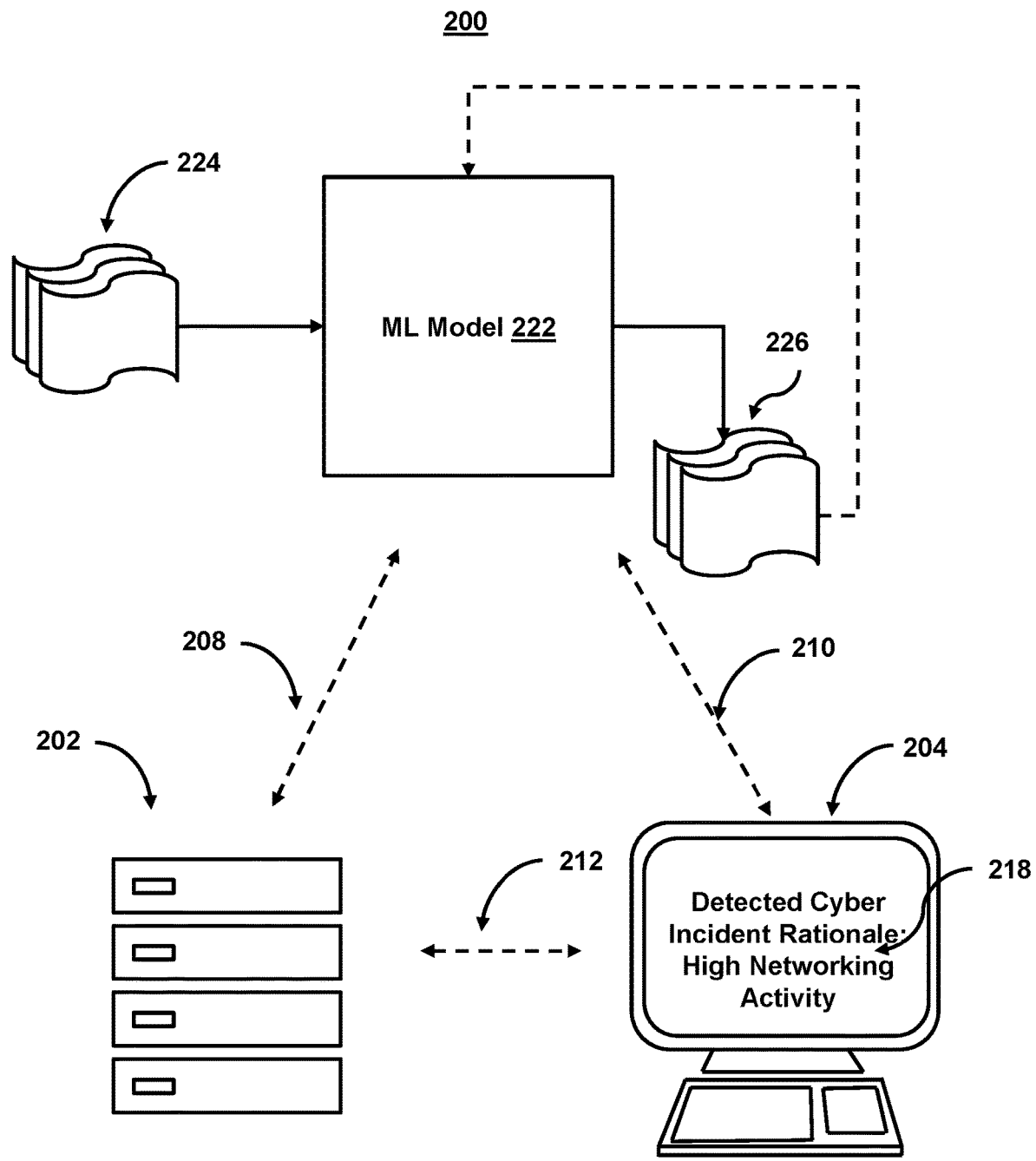
FIG. 2 shows a system featuring a machine learning model configured to generate recommendations for causes of computer alerts that are automatically detected by a machine learning algorithm, in accordance with one or more embodiments.

FIG. 2 shows a system featuring a machine learning model configured to generate recommendations for causes of computer alerts that are automatically detected by a machine learning algorithm, in accordance with one or more embodiments. As shown in FIG. 2, system 200 may include client device 202, client device 204 or other components. Each of client devices 202 and 204 may include any type of mobile terminal, fixed terminal, or other device. Each of these devices may receive content and data via input/output (hereinafter "I/O") paths and may also include processors and/or control circuitry to send and receive commands, requests, and other suitable data using the I/O paths. The control circuitry may comprise any suitable processing circuitry. Each of these devices may also include a user input interface and/or display for use in receiving and displaying data. By way of example, client devices 202 and 204 may include a desktop computer, a server, or other client device. Users may, for instance, utilize one or more client devices 202 and 204 to interact with one another, one or more servers, or other components of system 200. It should be noted that, while one or more operations are described herein as being performed by particular components of system 200, those operations may, in some embodiments, be performed by other components of system 200. As an example, while one or more operations are described herein as being performed by components of client device 202, those operations may, in some embodiments, be performed by components of client device 204. It should be noted that, although some embodiments are described herein with respect to machine learning models, other prediction models (e.g., statistical models or other analytics models) may be used in lieu of or in addition to machine learning models in other embodiments (e.g., a statistical model replacing a machine learning model and a non-statistical model replacing a non-machine-learning model in one or more embodiments).

Each of these devices may also include memory in the form of electronic storage. The electronic storage may include non-transitory storage media that electronically stores information. The electronic storage media of the electronic storages may include one or both of (i) system storage that is provided integrally (e.g., substantially non-removable) with servers or client devices or (ii) removable storage that is removably connectable to the servers or client devices via, for example, a port (e.g., a USB port, a firewire port, etc.) or a drive (e.g., a disk drive, etc.). The electronic storages may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storages may include one or more virtual storage resources (e.g., cloud storage, a virtual private network, and/or other virtual storage resources). The electronic storage may store software algorithms, information determined by the processors, information obtained from servers, information obtained from client devices, or other information that enables the functionality as described herein.

FIG. 2 also includes communication paths 208, 210, and 212. Communication paths 208, 210, and 212 may include the Internet, a mobile phone network, a mobile voice or data network (e.g., a 4G or LTE network), a cable network, a public switched telephone network, or other types of communications network or combinations of communications networks. Communication paths 208, 210, and 212 may separately or together include one or more communications paths, such as a satellite path, a fiber-optic path, a cable path, a path that supports Internet communications (e.g., IPTV), free-space connections (e.g., for broadcast or other wireless signals), or any other suitable wired or wireless communications path or combination of such paths. The computing devices may include additional communication paths linking a plurality of hardware, software, and/or firmware components operating together. For example, the computing devices may be implemented by a cloud of computing platforms operating together as the computing devices.

In some embodiments, system 200 may use one or more prediction models to generate recommendations for causes of computer alerts that are automatically detected by a machine learning algorithm. For example, as shown in FIG. 2, system 200 may detect a computer status alert (e.g., alert 104 (FIG. 1)) using machine learning model 222. The determination may be output shown as output 218 on client device 204. The system may include one or more neural networks (e.g., as discussed in relation to FIG. 3) or other machine learning models. System 200 may also provide a recommendation for the cause of the computer status alert (e.g., recommendation 110 (FIG. 1)) using machine learning model 222. The recommendation may be output shown as output 218 on client device 204.

As an example, with respect to FIG. 2, machine learning model 222 may take inputs 224 and provide outputs 226. The inputs may include multiple data sets such as a training data set and a test data set. For example, in some embodiments, the known alert status may comprise a detected fraudulent transaction, and the values corresponding to the plurality of computer states in the first computer system may indicate a transaction history of a user. The test data may comprise data on transaction histories labeled with a known fraudulent transaction. In some embodiments, the known alert status comprises a detected cyber incident, and the values corresponding to the plurality of computer states in the first computer system may indicate networking activity of a user. The test data may comprise data on networking activity labeled with known cyber incidents. In some embodiments, the known alert status may comprise a refusal of a credit application, and the values corresponding to the plurality of computer states in the first computer system may indicate credit history of a user. The test data may comprise data on credit histories labeled with a known refusals of credit applications. In some embodiments, the known alert status may comprise a detected identity theft, and the values corresponding to the plurality of computer states in the first computer system may indicate a user transaction history. The test data may comprise data on transaction histories labeled with a known instances of identity theft.

In one use case, outputs 226 may be fed back to machine learning model 222 as input to train machine learning model 222 (e.g., alone or in conjunction with user indications of the accuracy of outputs 226, labels associated with the inputs, or with other reference feedback information). In another use case, machine learning model 222 may update its configurations (e.g., weights, biases, or other parameters) based on its assessment of its prediction (e.g., outputs 226) and reference feedback information (e.g., user indication of accuracy, reference labels, or other information). In another use case, where machine learning model 222 is a neural network, connection weights may be adjusted to reconcile differences between the neural network's prediction and the reference feedback. In a further use case, one or more neurons (or nodes) of the neural network may require that their respective errors are sent backward through the neural network to them to facilitate the update process (e.g., backpropagation of error). Updates to the connection weights may, for example, be reflective of the magnitude of error propagated backward after a forward pass has been completed. In this way, for example, the machine learning model 222 may be trained to generate better predictions.

Machine learning model 222 may be trained to detect a known alert status based on a set of training data comprising labeled feature vectors corresponding to the known alert status, and wherein the artificial neural network is trained to detect conditional expectations the plurality of computer states in an inputted feature vector. For example, machine learning model 222 may have classifications for the known computer status alerts.

Figure 3:
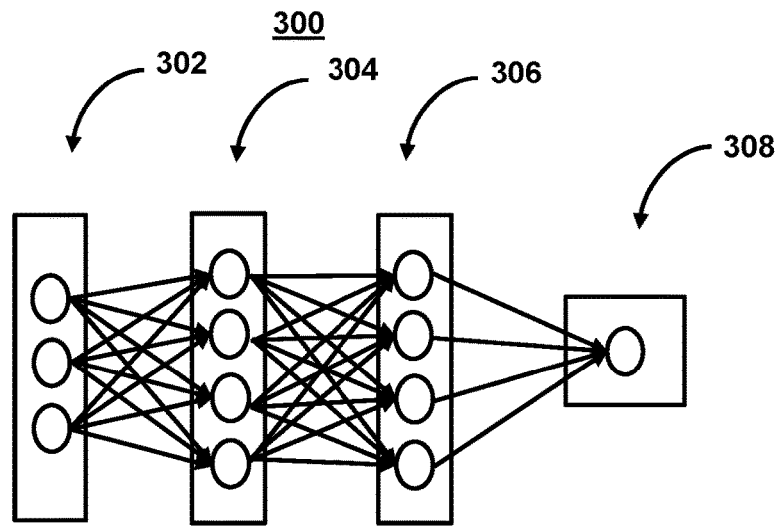
FIG. 3 shows graphical representations of artificial neural network models for generating recommendations for causes of computer alerts that are automatically detected by a machine learning algorithm, in accordance with one or more embodiments.
Figure 3:
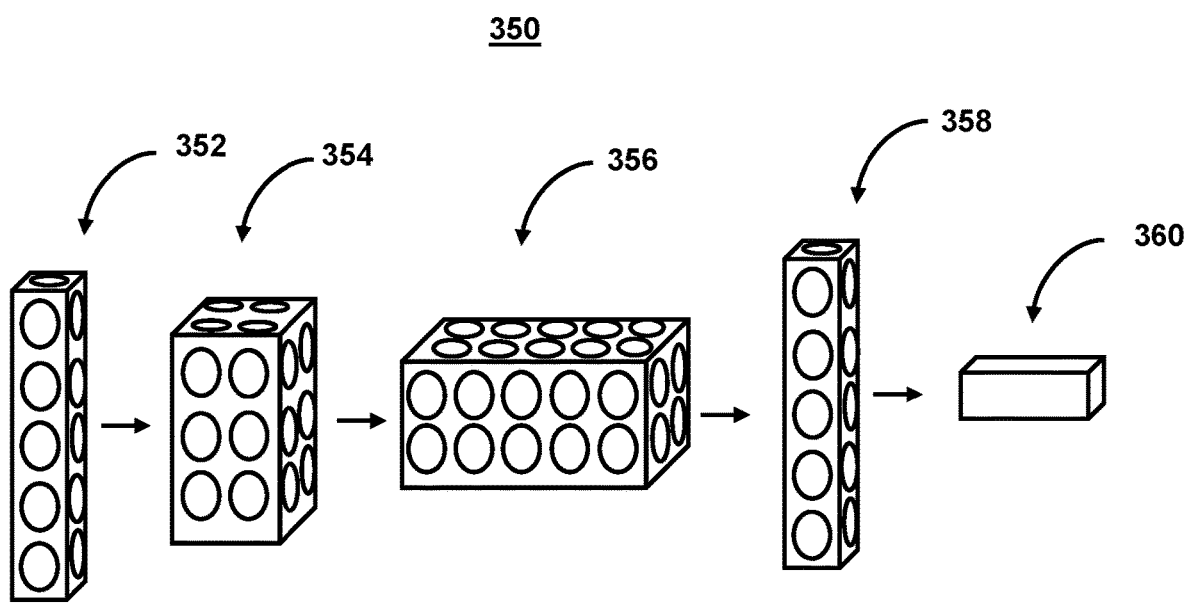

FIG. 3 shows graphical representations of artificial neural network models for generating recommendations for causes of computer alerts that are automatically detected by a machine learning algorithm, in accordance with one or more embodiments. Model 300 illustrates an artificial neural network. Model 300 includes input layer 302. Model 300 also includes one or more hidden layers (e.g., hidden layer 304 and hidden layer 306). Model 300 may be based on a large collection of neural units (or artificial neurons). Model 300 loosely mimics the manner in which a biological brain works (e.g., via large clusters of biological neurons connected by axons). Each neural unit of a model 300 may be connected with many other neural units of model 300. Such connections can be enforcing or inhibitory in their effect on the activation state of connected neural units. In some embodiments, each individual neural unit may have a summation function which combines the values of all of its inputs together. In some embodiments, each connection (or the neural unit itself) may have a threshold function such that the signal must surpass before it propagates to other neural units. Model 300 may be self-learning and trained, rather than explicitly programmed, and can perform significantly better in certain areas of problem solving, as compared to traditional computer programs. During training, output layer 308 may correspond to a classification of model 300 (e.g., whether or not an alert status corresponds to a given values corresponding to the plurality of computer states) and an input known to correspond to that classification may be input into input layer 302. In some embodiments, model 300 may include multiple layers (e.g., where a signal path traverses from front layers to back layers). In some embodiments, back propagation techniques may be utilized by model 300 where forward stimulation is used to reset weights on the "front" neural units. In some embodiments, stimulation and inhibition for model 300 may be more free-flowing, with connections interacting in a more chaotic and complex fashion. Model 300 also includes output layer 308. During testing, output layer 308 may indicate whether or not a given input corresponds to a classification of model 300 (e.g., whether or not an alert status corresponds to a given values corresponding to the plurality of computer states).

FIG. 3 also includes model 350, which is a convolutional neural network. The convolutional neural network is an artificial neural network that features one or more convolutional layers. As shown in model 350, input layer 352 may proceed to convolution blocks 354 and 356 before being output to convolutional block 358. In some embodiments, model 350 may itself serve as an input to model 300. Model 350 may generate output 360, which may include data used to generate a recommendation (e.g., recommendation 110 (FIG. 1)).

In some embodiments, model 350 may implement an inverted residual structure where the input and output of a residual block (e.g., block 354) are thin bottleneck layers. A residual layer may feed into the next layer and directly into layers that are one or more layers downstream. A bottleneck layer (e.g., block 358) is a layer that contains few neural units compared to the previous layers. Model 350 may use a bottleneck layer to obtain a representation of the input with reduced dimensionality. An example of this is the use of autoencoders with bottleneck layers for nonlinear dimensionality reduction. Additionally, model 350 may remove non-linearities in a narrow layer (e.g., block 358) in order to maintain representational power. In some embodiments, the design of model 350 may also be guided by the metric of computation complexity (e.g., the number of floating point operations). In some embodiments, model 350 may increase the feature map dimension at all units to involve as many locations as possible instead of sharply increasing the feature map dimensions at neural units that perform downsampling. In some embodiments, model 350 may decrease the depth and increase width of residual layers in the downstream direction.

Input layer 302 and input layer 352 may also feature one or more binary masks. For example, in some embodiments, an input layer to the artificial neural network may augmented with a set of binary masks, one for each feature in the original input. The system then trains the neural network. For example, the system may use gradient descent where, at each gradient descent step, the system randomly selects a subset of the masks to be on (e.g., set to a value of "1") or off (e.g., set to a value of "0," a mean or mode for that feature, or selected randomly from the training values). Alternatively or additionally, the system may systematically select a subset of masks based on one or more criteria. Accordingly, the system learns to make accurate predictions in the circumstances where there is missing data, by using information about which features are missing to guide its training. Once the system is trained, the system may make full predictions by simply setting all mask values to on and leaving the feature input unchanged. The system may also predict conditional expectations by setting the masks of any of the features to be left out to off and mangling the corresponding feature values. These conditional expectations can then be used to predict SHAP values with no need for assuming feature independence or a more complex sampling-based approach.

Figure 4:
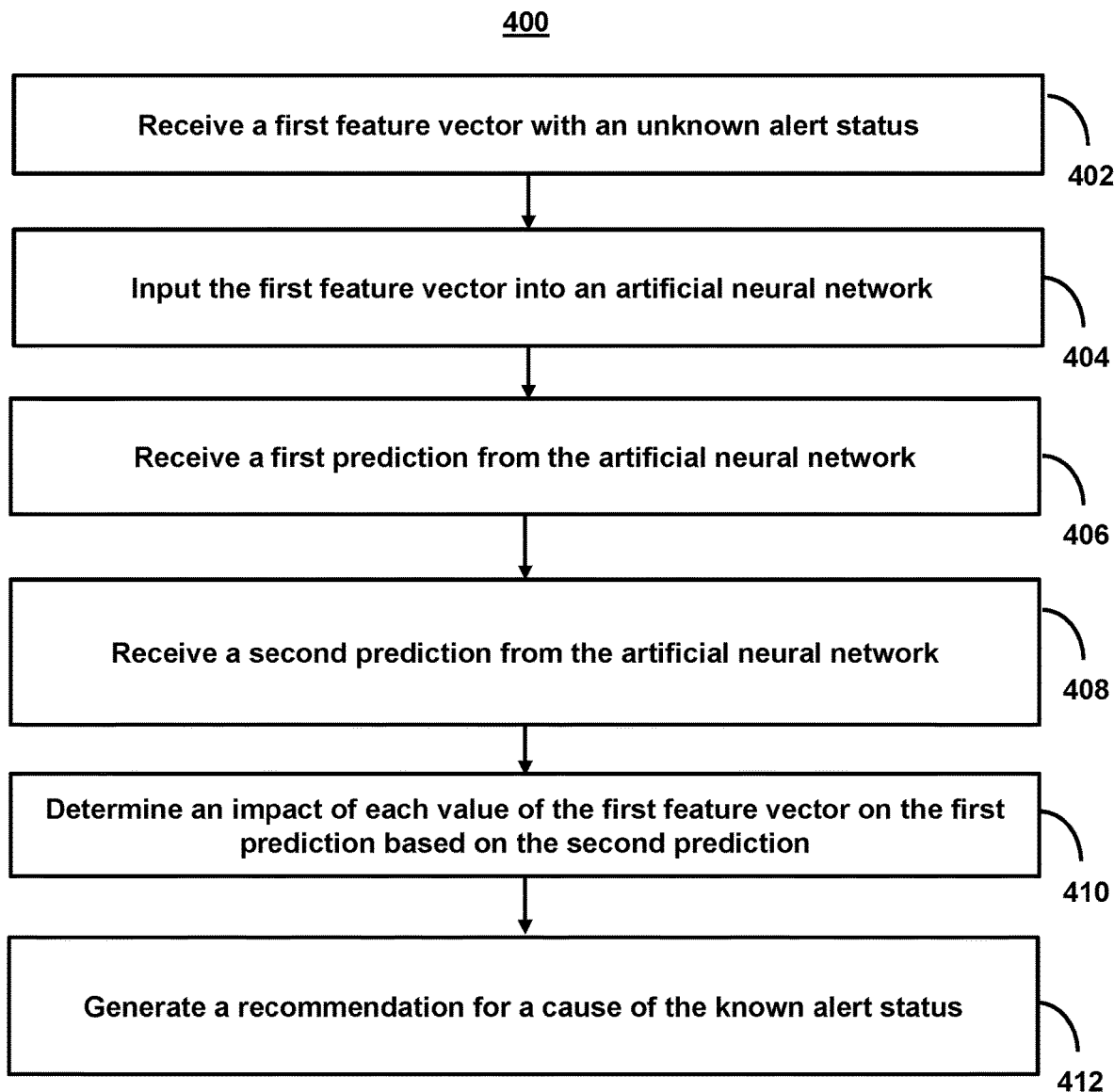
FIG. 4 shows a flowchart for generating recommendations for causes of computer alerts that are automatically detected by a machine learning algorithm, in accordance with one or more embodiments.

FIG. 4 shows a flowchart for generating recommendations for causes of computer alerts that are automatically detected by a machine learning algorithm, in accordance with one or more embodiments. For example, process 400 may represent the steps taken by one or more devices as shown in FIGS. 1-3 for generating recommendations for causes of computer alerts that are automatically detected by a machine learning algorithm. For example, process 400 deviates from the conventional model agnosticism of SHAP systems in order to avoid the potentially problematic assumption of feature independence. For example, process 400 may perform additional computational overhead up front during model training to reduce the later complexity of generating explanations. Process 400 achieves this by using a novel artificial neural network architecture that is trained to be able to not only make predictions, but also compute the conditional expectations that are the theoretical foundation of the SHAP approach.

At step 402, process 400 receives (e.g., using one or more components of system 200 (FIG. 2)) a first feature vector with an unknown alert status. For example, the system may receive a first feature vector with an unknown alert status, wherein the first feature vector represents values corresponding to a plurality of computer states in a first computer system.

In some embodiments, the known alert status may comprise a detected fraudulent transaction, and the values corresponding to the plurality of computer states in the first computer system may indicate a transaction history of a user. In some embodiments, the known alert status comprises a detected cyber incident, and the values corresponding to the plurality of computer states in the first computer system may indicate networking activity of a user. In some embodiments, the known alert status may comprise a refusal of a credit application, and the values corresponding to the plurality of computer states in the first computer system may indicate credit history of a user. In some embodiments, the known alert status may comprise a detected identity theft, and the values corresponding to the plurality of computer states in the first computer system may indicate a user transaction history.

At step 404, process 400 inputs (e.g., using one or more components of system 200 (FIG. 2)) the first feature vector into an artificial neural network. For example, the system may input the first feature vector into an artificial neural network, wherein the artificial neural network is trained to detect a known alert status based on a set of training data comprising labeled feature vectors corresponding to the known alert status, and wherein the artificial neural network is trained to detect a conditional expectations for the plurality of computer states in an inputted feature vector.

For example, the artificial neural network may comprise an input layer of the artificial neural network comprises a binary mask for each value of the first feature vector. For example, in some embodiments, the system comprises a modified version of a fully-connected neural network, in which the input layer to the neural network is augmented with a set of binary masks, one for each feature in the original input. The system may train the artificial neural network using gradient descent where, at each gradient descent step, the system randomly selects a subset of the masks to be on (e.g., set to a value of "1") or off (e.g., set to a value of "0," a mean or mode for that feature, or selected randomly from the training values). Accordingly, the system learns to make accurate predictions in the circumstances where there is missing data, by using information about which features are missing to guide its training At step 406, process 400 receives (e.g., using one or more components of system 200 (FIG. 2)) a first prediction from the artificial neural network. For example, the system may receive a first prediction from the artificial neural network, wherein the first prediction indicates whether the first feature vector corresponds to the known alert status. For example, the system may make full predictions by simply setting all mask values to on and leaving the feature input unchanged.

At step 408, process 400 receives (e.g., using one or more components of system 200 (FIG. 2)) a second prediction from the artificial neural network. For example, the system may receive a second prediction from the artificial neural network, wherein the second prediction indicates a conditional expectation for each value of the first feature vector. For example, the system may also predict conditional expectations by setting the masks any of the features to be left out to off and mangling the corresponding feature values.

At step 410, process 400 determines (e.g., using one or more components of system 200 (FIG. 2)) an impact of each value of the first feature vector on the first prediction based on the second prediction. For example, the system may determine an impact of each value of the first feature vector on the first prediction based on the second prediction. For example, the system may determine the impact of each value of the first feature vector on the first prediction by determining a SHAP ("Shapley Additive explanation") value for each value of the first feature vector. For example, the conditional expectations may be used to predict SHAP values with no need for assuming feature independence or a more complex sampling-based approach.

At step 412, process 400 generates (e.g., using one or more components of system 200 (FIG. 2)) for display, a recommendation for a cause of the known alert status. For example, the system may generate for display, on a user interface, a recommendation for a cause of the known alert status in the first computer system based on the impact of each value of the first feature vector on the first prediction.

For example, in embodiments where the known alert status comprises a detected fraudulent transaction, and the system may identify the occurrence of the known alert status as well as indicating which value (e.g., a given transaction and/or characteristic thereof) triggered the alert. In embodiments where the known alert status comprises a detected cyber incident, and the system may identify the occurrence of the known alert status as well as indicating which value (e.g., an instance of network activity and/or characteristic thereof) triggered the alert. In embodiments where the known alert status comprises a refusal of a credit application, and the system may identify the occurrence of the known alert status as well as indicating which value (e.g., a given applicant or account value, user history category, regulation criteria, and/or characteristic thereof) triggered the alert. In embodiments where the known alert status comprises a detected identity theft, and the system may identify the occurrence of the known alert status as well as indicating which value (e.g., a transaction and/or characteristic thereof) triggered the alert.

It is contemplated that the steps or descriptions of FIG. 4 may be used with any other embodiment of this disclosure. In addition, the steps and descriptions described in relation to FIG. 4 may be done in alternative orders or in parallel to further the purposes of this disclosure. For example, each of these steps may be performed in any order or in parallel or substantially simultaneously to reduce lag or increase the speed of the system or method. Furthermore, it should be noted that any of the devices or equipment discussed in relation to FIGS. 1-3 could be used to perform one or more of the steps in FIG. 4.

Figure 5:
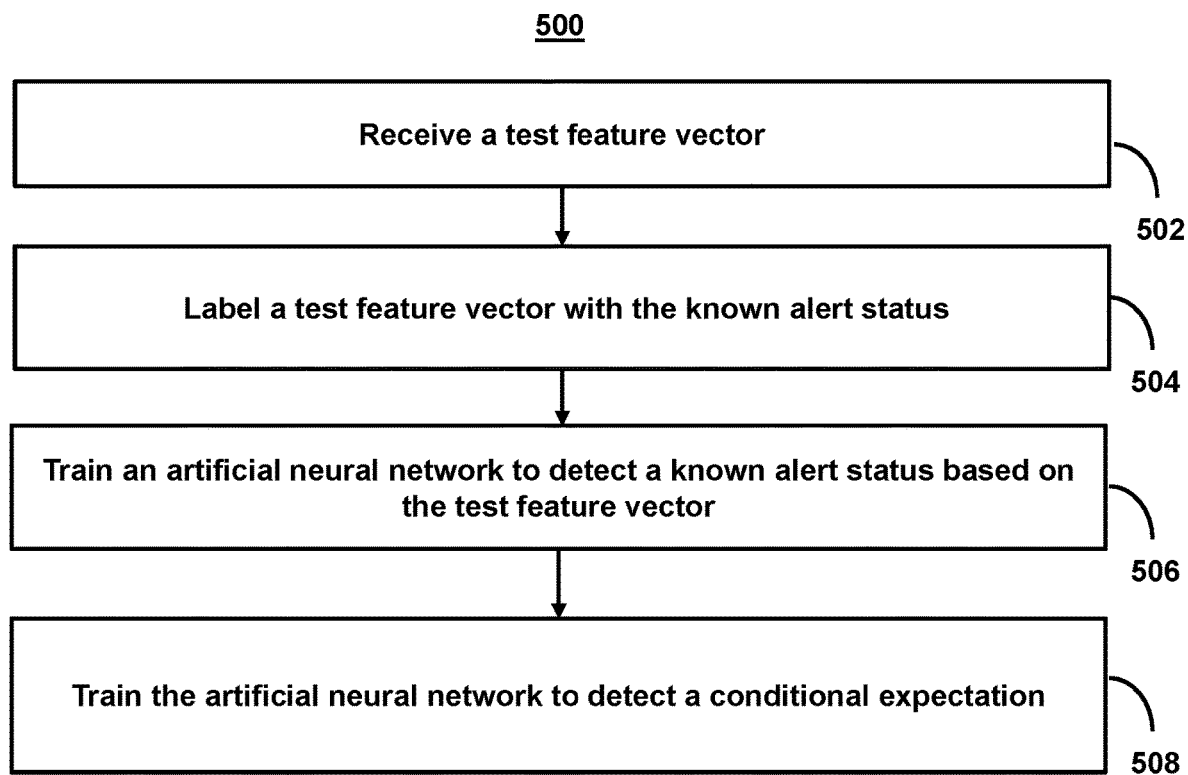
FIG. 5 shows a flowchart for training an artificial neural network to generate recommendations for causes of computer alerts that are automatically detected by a machine learning algorithm, in accordance with one or more embodiments.

FIG. 5 shows a flowchart for training an artificial neural network to generate recommendations for causes of computer alerts that are automatically detected by a machine learning algorithm, in accordance with one or more embodiments. For example, process 500 may represent the steps taken by one or more devices as shown in FIGS. 1-3 for generating recommendations for causes of computer alerts that are automatically detected by a machine learning algorithm.

At step 502, process 500 receives (e.g., using one or more components of system 200 (FIG. 2)) a test feature vector. For example, the system may receive a test feature vector, wherein the test feature vector represents test values corresponding to computer states that correspond to the known alert status.

At step 504, process 500 labels (e.g., using one or more components of system 200 (FIG. 2)) a test feature vector with the known alert status. For example, the system may label the test feature vector with the known alert status.

At step 506, process 500 trains (e.g., using one or more components of system 200 (FIG. 2)) an artificial neural network to detect a known alert status based on the test feature vector. For example, the system may train the artificial neural network to detect the known alert status based on the test feature vector.

At step 508, process 500 trains (e.g., using one or more components of system 200 (FIG. 2)) the artificial neural network to detect a conditional expectation. For example, the system may train the artificial neural network to detect the conditional expectation for each of the plurality of computer states in an inputted feature vector. For example, the system may apply a gradient descent and randomly select a subset of binary masks, each of the binary masks corresponding to a respective one of a plurality of computer states to be toggled between an active state and an inactive state. In another example, the system may apply a gradient descent and randomly select a subset of binary masks, each of the binary masks corresponding to a respective one of the plurality of computer states to set a respective value of the inputted feature vector to an average value.

It is contemplated that the steps or descriptions of FIG. 5 may be used with any other embodiment of this disclosure. In addition, the steps and descriptions described in relation to FIG. 5 may be done in alternative orders or in parallel to further the purposes of this disclosure. For example, each of these steps may be performed in any order or in parallel or substantially simultaneously to reduce lag or increase the speed of the system or method. Furthermore, it should be noted that any of the devices or equipment discussed in relation to FIGS. 1-3 could be used to perform one or more of the steps in FIG. 5.

Although the present invention has been described in detail for the purpose of illustration based on what is currently considered to be the most practical and preferred embodiments, it is to be understood that such detail is solely for that purpose and that the invention is not limited to the disclosed embodiments, but on the contrary, is intended to cover modifications and equivalent arrangements that are within the scope of the appended claims. For example, it is to be understood that the present invention contemplates that, to the extent possible, one or more features of any embodiment can be combined with one or more features of any other embodiment.

The present techniques will be better understood with reference to the following enumerated embodiments:

1. A method for generating recommendations for causes of computer alerts that are automatically detected by a machine learning algorithm, comprising: receiving a first feature vector with an unknown alert status, wherein the first feature vector represents values corresponding to a plurality of computer states in a first computer system; inputting the first feature vector into an artificial neural network, wherein the artificial neural network is trained to detect a known alert status based on a set of training data comprising labeled feature vectors corresponding to the known alert status, and wherein the artificial neural network is trained to detect conditional expectations the plurality of computer states in an inputted feature vector; receiving a first prediction from the artificial neural network, wherein the first prediction indicates whether the first feature vector corresponds to the known alert status; receiving a second prediction from the artificial neural network, wherein the second prediction indicates a conditional expectation for each value of the first feature vector; determining an impact of each value of the first feature vector on the first prediction based on the second prediction; and generating for display, on a user interface, a recommendation for a cause of the known alert status in the first computer system based on the impact of each value of the first feature vector on the first prediction.

2. The method of embodiment 2, further comprising: receiving a test feature vector, wherein the test feature vector represents test values corresponding to computer states that correspond to the known alert status; labeling the test feature vector with the known alert status; and training the artificial neural network to detect the known alert status based on the test feature vector.

3. The method of any one of embodiments 1-2, wherein an input layer of the artificial neural network comprises a binary mask for each value of the first feature vector.

4. The method of any one of embodiments 1-3, further comprising training the artificial neural network to detect the conditional expectation for each of the plurality of computer states in the inputted feature vector by: applying a gradient descent; and randomly selecting a subset of binary masks, each of the binary masks corresponding to a respective one of the plurality of computer states to be toggled between an active state and an inactive state.

5. The method of any one of embodiments 1-4, further comprising training the artificial neural network to detect the conditional expectation for each of the plurality of computer states in the inputted feature vector by: applying a gradient descent; and randomly selecting a subset of binary masks, each of the binary masks corresponding to a respective one of the plurality of computer states to set a respective value of the inputted feature vector to an average value.

6. The method of any one of embodiments 1-5, wherein determining the impact of each value of the first feature vector on the first prediction comprises determining a SHAP ("Shapley Additive explanation") value for each value of the first feature vector.

7. The method of any one of embodiments 1-6, wherein the known alert status comprises a detected fraudulent transaction, and wherein the values corresponding to the plurality of computer states in the first computer system indicate a transaction history of a user.

8. The method of any one of embodiments 1-7, wherein the known alert status comprises a detected cyber incident, and wherein the values corresponding to the plurality of computer states in the first computer system indicate networking activity of a user.

9. The method of any one of embodiments 1-8, wherein the known alert status comprises a refusal of a credit application, and wherein the values corresponding to the plurality of computer states in the first computer system indicate credit history of a user.
10. The method of any one of embodiments 1-9, wherein the known alert status comprises a detected identity theft, and wherein the values corresponding to the plurality of computer states in the first computer system indicate a user transaction history.
11. A system comprising means for performing any of the steps as described in any of embodiments 1-10.
12. A tangible, non-transitory, machine-readable medium storing instructions that, when executed by a data processing apparatus, cause the data processing apparatus to perform operations comprising those of any of embodiments 1-10.
13. A system comprising: one or more processors; and memory storing instructions that, when executed by the processors, cause the processors to effectuate operations comprising those of any of embodiments 1-10.
14. A system comprising: one or more cloud-based processors; and cloud-based memory storing instructions that, when executed by the processors, cause the processors to effectuate operations comprising those of any of embodiments 1-10.

What is claimed is:

1. A system for generating recommendations for causes of computer security alerts that are automatically detected by a machine learning algorithm monitoring network activity, comprising:
   one or more processors; and
   a non-transitory computer-readable medium comprising instructions that, when executed by the one or more processors, cause operations comprising:
      receiving a first feature vector with an unknown alert status, wherein the first feature vector represents values corresponding to a plurality of computer states in a first computer system, and wherein the unknown alert status comprises detected cyber incident;
      determining, using an artificial neural network, a first prediction and a second prediction, wherein the first prediction indicates whether the first feature vector corresponds to a known alert status, wherein the second prediction indicates a conditional expectation for each value of the first feature vector, and wherein the artificial neural network is trained to detect known alert statuses based on training data comprising labeled feature vectors corresponding to the known alert statuses, and wherein the artificial neural network is trained to detect conditional expectations the plurality of computer states in inputted feature vectors;
      determining an impact of each value of the first feature vector on the first prediction based on the second prediction; and
      determining cause of the known alert status in the first computer system based on the impact of each value of the first feature vector on the first prediction, wherein the known alert status comprises a detected cyber incident, and wherein the values corresponding to the plurality of computer states in the first computer system indicate networking activity of a user.

2. A non-transitory computer-readable medium comprising instructions that, when executed by one or more processors, cause operations comprising:
   receiving a first feature vector with an unknown alert status, wherein the first feature vector represents values corresponding to a plurality of computer states in a first computer system;
   determining, using an artificial neural network, a first prediction and a second prediction, wherein the first prediction indicates whether the first feature vector corresponds to a known alert status, wherein the second prediction indicates a conditional expectation for each value of the first feature vector, and wherein the artificial neural network is trained to detect known alert statuses based on training data comprising labeled feature vectors corresponding to the known alert statuses, and wherein the artificial neural network is trained to detect conditional expectations the plurality of computer states in inputted feature vectors;
   determining an impact of each value of the first feature vector on the first prediction based on the second prediction; and
   determining a cause of the known alert status in the first computer system based on the impact of each value of the first feature vector on the first prediction.

3. The non-transitory computer-readable medium of claim 2, wherein the instructions further cause operations comprising:
   receiving a test feature vector, wherein the test feature vector represents test values corresponding to computer states that correspond to the known alert status;
   labeling the test feature vector with the known alert status; and
   training the artificial neural network to detect the known alert status based on the test feature vector.

4. The non-transitory computer-readable medium of claim 2, wherein an input layer of the artificial neural network comprises a binary mask for each value of the first feature vector.

5. The non-transitory computer-readable medium of claim 2, wherein the instructions further cause operations comprising training the artificial neural network to detect the conditional expectation for each of the plurality of computer states in the inputted feature vectors by:
   applying a gradient descent; and
   randomly selecting a subset of binary masks, each of the subset of binary masks corresponding to a respective one of the plurality of computer states to be toggled between an active state and an inactive state.

6. The non-transitory computer-readable medium of claim 2, wherein the instructions further cause operations comprising training the artificial neural network to detect the conditional expectation for each of the plurality of computer states in the inputted feature vectors by:
   applying a gradient descent; and
   randomly selecting a subset of binary masks, each of the subset of binary masks corresponding to a respective one of the plurality of computer states to set a respective value of the inputted feature vectors to an average value.

7. The non-transitory computer-readable medium of claim 2, wherein determining the impact of each value of the first feature vector on the first prediction comprises determining a SHAP ("Shapley Additive explanation") value for each value of the first feature vector.

8. The non-transitory computer-readable medium of claim 2, wherein the known alert status comprises a detected fraudulent transaction, and wherein the values corresponding to the plurality of computer states in the first computer system indicate a transaction history of a user.

9. The non-transitory computer-readable medium of claim 2, wherein the known alert status comprises a detected cyber incident, and wherein the values corresponding to the plurality of computer states in the first computer system indicate networking activity of a user.

10. The non-transitory computer-readable medium of claim 2, wherein the known alert status comprises a refusal of a credit application, and wherein the values corresponding to the plurality of computer states in the first computer system indicate credit history of a user.

* * * * *